United States Patent [19]

Marlier et al.

[11] Patent Number: 4,630,488

[45] Date of Patent: Dec. 23, 1986

[54] SINGLE JET LIQUID METER

[75] Inventors: Alain Marlier, Lugny; Henri Oszajca, Macon, both of France

[73] Assignee: Flonic, Montrouge, France

[21] Appl. No.: 749,032

[22] Filed: Jun. 26, 1985

[30] Foreign Application Priority Data

Jun. 28, 1984 [FR] France .................. 84 10212

[51] Int. Cl.[4] .................. G01F 1/07; G01F 1/08
[52] U.S. Cl. .................. 73/861.81; 73/861.88
[58] Field of Search ........... 73/861.79, 861.81, 861.82, 73/861.87, 861.88, 861.33

[56] References Cited

U.S. PATENT DOCUMENTS

| 127,575 | 6/1872 | Cook | 73/861.79 |
| 3,256,736 | 6/1966 | Lee et al. | 73/861.87 |
| 4,088,021 | 5/1978 | Farnier | 73/861.88 |
| 4,548,084 | 10/1985 | Onoda et al. | 73/861.81 |

FOREIGN PATENT DOCUMENTS 0052705 2/1937 Denmark .................. 73/861.81

Primary Examiner—Charles A. Ruehl
Attorney, Agent, or Firm—Dale Gaudier

[57] ABSTRACT

A single jet liquid meter comprises a cylindrical measuring chamber having first and second end walls perpendicular to the axis of the chamber, an injector and an ejector in communication with the measuring chamber, and a turbine having a hub and plurality of blades fixed to the hub. The hub has first and second end faces disposed opposite the first and second end walls, respectively. A pivot and shaft guide the turbine in rotation about the axis of the chamber. A set of radiating ribs are fixed to the first end wall and project into the chamber. The meter further includes an assembly consisting of an axial stop disposed adjacent the first end face and includes a pivot having a tapering point and an abutment which is in contact with the point when the liquid flow rate is zero. The meter is arranged such that the second end face is subjected to a pressure reduction effect produced by rotation of the liquid in the chamber. A collar and annular zone are provided for protecting the first end face from the reduced pressure effect at low speeds of rotation of the turbine, in such a manner that the turbine moves axially to take the point out of contact with the abutment, and to subject the first end face to the pressure reduction phenomenon from a given axial displacement of the turbine, such that the turbine is fixed axially under the reduced pressure effect which is applied to both of the end faces.

13 Claims, 11 Drawing Figures

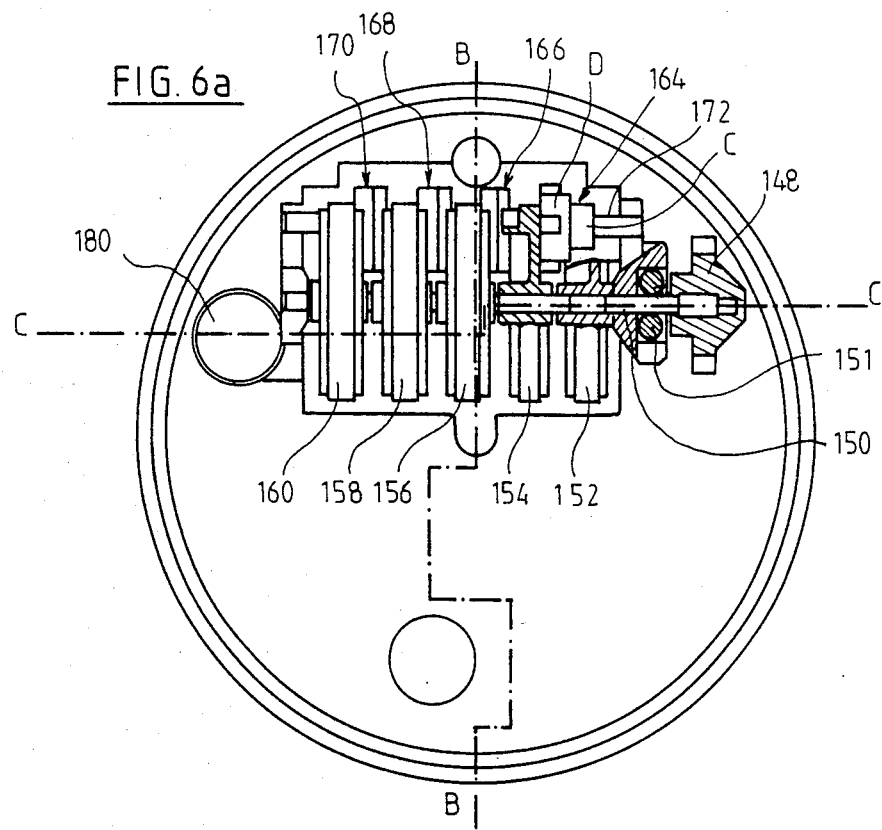
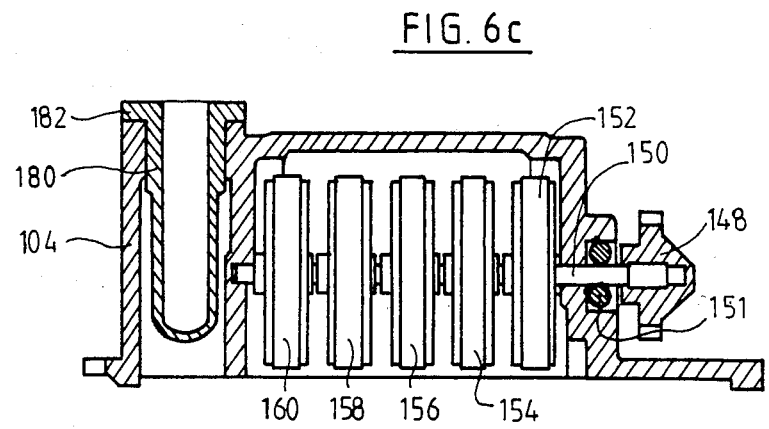

4,630,488

SINGLE JET LIQUID METER

The present invention relates to a meter for liquid, in particular water, of the type having a single jet.

More precisely the present invention relates to a liquid meter of this type having improved sensitivity, in particular at low flow rates.

BACKGROUND OF THE INVENTION

Water meters may be divided into two large categories: volumetric meters and speed meters. Volumetric meters, e.g. meters having a rotating piston, enable very good sensitivity to be obtained at low flow rates, but their manufacturing cost is relatively high because they require highly accurate machining.

Speed meters may be sub-divided into Woltman type meters in which liquid flow rotates a propeller whose axis of rotation is parallel to the direction of liquid flow, and jet meters in which the liquid to be measured enters a measurement chamber perpendicularly to the axis of rotation of a turbine.

Woltman type meters are well adapted to metering liquids flowing in large bore pipework (typically not less than 80 mm in diameter) whereas jet type meters are used in conjunction with medium and small diameter ducts.

Jet type meters may further be sub-divided into single jet meters and multiple jet meters. In multiple jet meters the water inlet pipework opens out into an annular feed chamber. The measuring chamber in which the turbine is mounted is separated from the feed chamber by a cylindrical wall having orifices therethrough. The measurement chamber is thus fed by a plurality of jets created by these orifices, which jets cause the turbine to rotate. Multiple jet meters have good sensitivity, but their manufacturing cost is relatively high because of their relatively complex structure.

In single jet meters, the upstream pipework opens directly into the measuring chamber via an injector. The structure of such meters is thus much simpler and their cost is reduced. However, meters of this type generally suffer from mediocre sensitivity at low flow rates, and they can only be used as subsidiary meters because of their mediocre measuring qualities.

French published patent specification No. 2 336 666 seeks to remedy this drawback, i.e. to provide a single jet meter which has adequate measuring qualities to be used as a main or principal meter, by using a special method of pivoting the turbine to limit the friction torque at low flow rates, i.e. at low speeds of turbine rotation. According to that patent specification, the bottom end of the turbine's vertical shaft is terminated by a fine point, while its top end is terminated by a flat abutment surface.

At low flow rates, the shaft is supported by its fine point engaging a jewel which ensures sensitivity because of the low friction torque. As the flow rate increases, the bottom point lifts progressively out from the jewel until the turbine is completely lifted and has its top abutment surface pressing against a thrust bearing of suitable dimensions for the thrust involved. The turbine is lifted because of a vertical component in the resultant of the forces applied to the turbine. This component is increased by the presence of radial ribs projecting from the bottom of the measuring chamber.

Although this solution serves to reduce the friction torque at low flow rates, and thus to improve meter sensitivity in this operating range, it nevertheless suffers from the drawback of requiring a strong top bearing capable of absorbing the axial thrust from the turbine when operating at high speeds of rotation.

An object of the invention is to provide a single jet meter in which the turbine bearings are further improved so as to enable good sensitivity, particularly at low flow rates, while retaining low manufacturing costs compatible with mass production.

SUMMARY OF THE INVENTION

In a first aspect the present invention provides a meter comprising: a cylindrical measuring chamber having first and second end walls perpendicular to the axis of said chamber; an injector and an ejector in communication with said measuring chamber; a turbine having a hub and plurality of blades fixed to said hub, said hub having first and second end faces disposed opposite said first and second end walls respectively; means for guiding the said turbine in rotation about the axis of said chamber; a set of radiating ribs fixed to said first end wall and projecting into said chamber; the meter including the improvement whereby it further comprises an assembly constituting an axial stop disposed adjacent said first end face and constituted by a pivot having a tapering point and an abutment which is in contact with said point when the liquid flow rate is zero, means for subjecting said second end face to a pressure reduction effect produced by rotation of said liquid in said chamber, and means for protecting said first end face from said reduced pressure effect at low speeds of rotation of said turbine, in such a manner that the turbine moves axially to take said point out of contact with said abutment, and to subject said first end face to said pressure reduction phenomenon from a given axial displacement of said turbine, such that said turbine is fixed axially under the reduced pressure effect which is applied to both of said end faces.

It can thus be seen that the axial position of the turbine is regulated in such a manner that the turbine pivot point is in contact with the abutment at low speeds of rotation, that the turbine moves progressively away from said contact up to a given distance with increasing speed; and that the turbine then occupies a stable axial position above a given speed without requiring an axial end stop.

In a second aspect the present invention provides a meter comprising: a cylindrical measuring chamber having first and second end walls perpendicular to the axis of said chamber; an injector and an ejector in communication with said measuring chamber; a turbine having a hub and plurality of blades fixed to said hub, said hub having first and second end faces disposed opposite said first and second end walls respectively; means for guiding the said turbine in rotation about the axis of said chamber; an assembly constituting an axial stop disposed in the vicinity of said first end face and formed by a pivot having a point and an abutment which is in contact with said point when the liquid flow rate is zero; and a set of radiating ribs fixed to the first end wall of the measuring chamber, said ribs being suitable at low flow rates of the liquid to be measured for generating vortex phenomena in the spaces separating said ribs in such a manner that said vortex phenomena creates a hydraulic plug in the vicinity of said first end wall such that the zone left free for laminar flow between the meter turbine and said hydraulic plug extends in the direction of said axis of rotation over a length which is not greater than the distance in the same direction between said ribs and said turbine.

Thus, by forming the hydraulic plug, the zone situated beneath the turbine blades in which a laminar flow develops is of reduced length in the direction of the axis of rotation of the turbine. As a result the speed of the liquid under laminar conditions increases thereby improving the sensitivity of the meter at low flow rates.

BRIEF DESCRIPTION OF THE DRAWINGS

An embodiment of the invention is described by way of example with reference to the accompanying drawings, in which:

FIG. 6a is a plan view of a totalizing display for the meter, with the front plate removed;

FIG. 6b is a section on a line B—B of FIG. 6a;

FIG. 6c is a section on a line C—C of FIG. 6a;

MORE DETAILED DESCRIPTION

Figure 2:
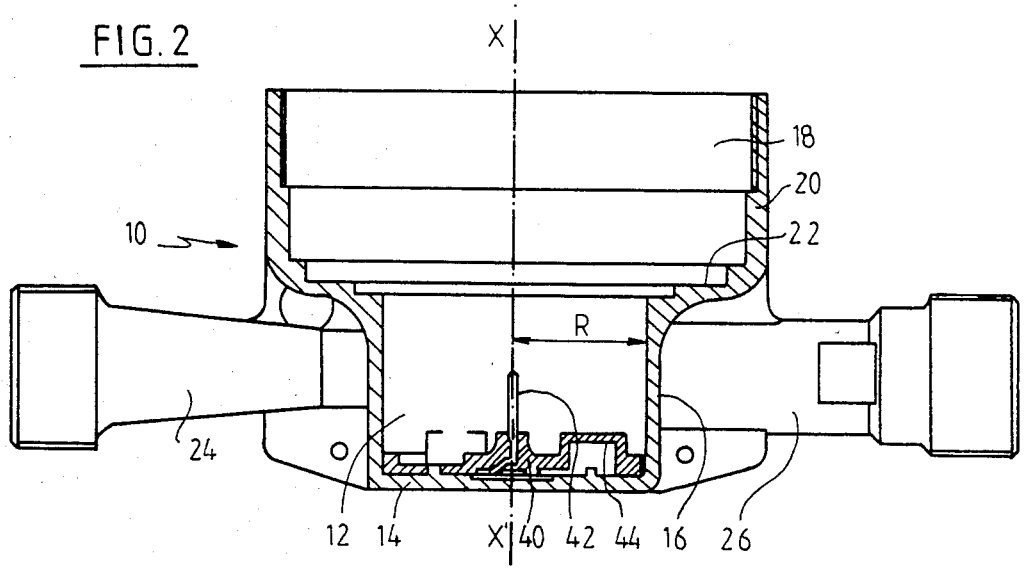
FIG. 2 is a vertical section through the body of the FIG. 1 meter on a line II—II.
Figure 1:
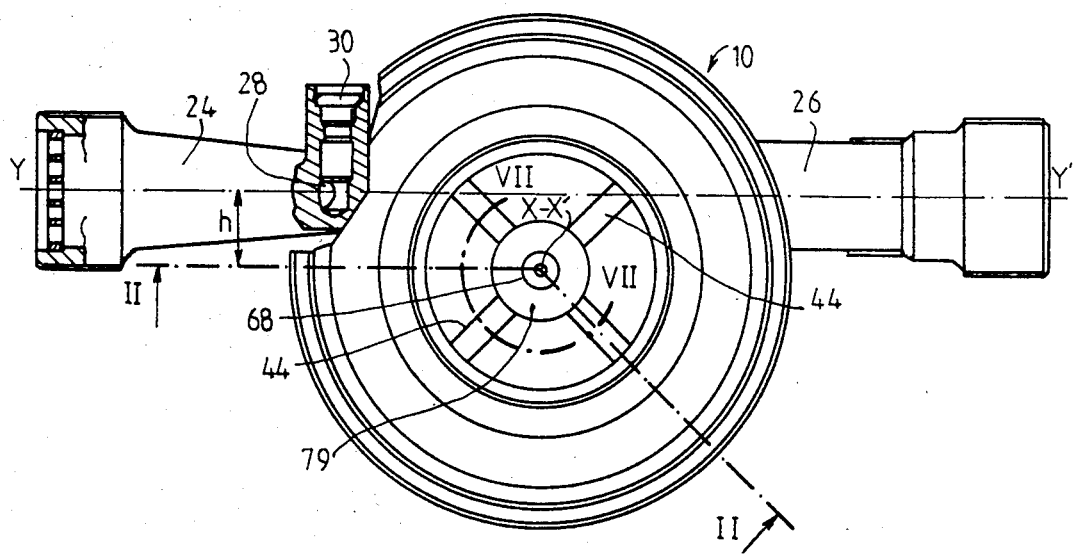
FIG. 1 is a plan view looking down on the body of a single jet meter in accordance with the invention.

FIGS. 1 and 2 show a body assembly for a single jet meter in accordance with the invention. The body comprises a bowl 10 which is circularly symmetrical about an axis XX'. The bowl 10 defines a lower cylindrical portion 12 of reduced diameter and delimited by a bottom 14 and a side wall 16, together with an upper portion 18 of greater diameter and delimited by a side wall 20. The side walls 16 and 20 are interconnected by a shoulder 22.

The meter body also includes an injector 24 which communicates with the bottom portion 12, and an ejector 26 which likewise communicates with the bottom portion 12. As can be seen in FIG. 2, the injector 24 and the ejector 26 share a common axis YY' which is orthogonal to the axis of symmetry XX' of the meter bowl 10. The distance h between the axes XX' and YY' is preferably about 0.55 R, where R is the radius of the lower portion 12. However, as can be seen in FIG. 1, the meter body includes a stub duct 28 associated with an adjustment screw 30 serving, in conventional manner, for final adjustment of the meter. This portion is therefore not described in greater detail.

The bottom portion 12 constitutes the measuring chamber of the meter in which a turbine 32 (see FIG. 3) is mounted.

Figure 3:
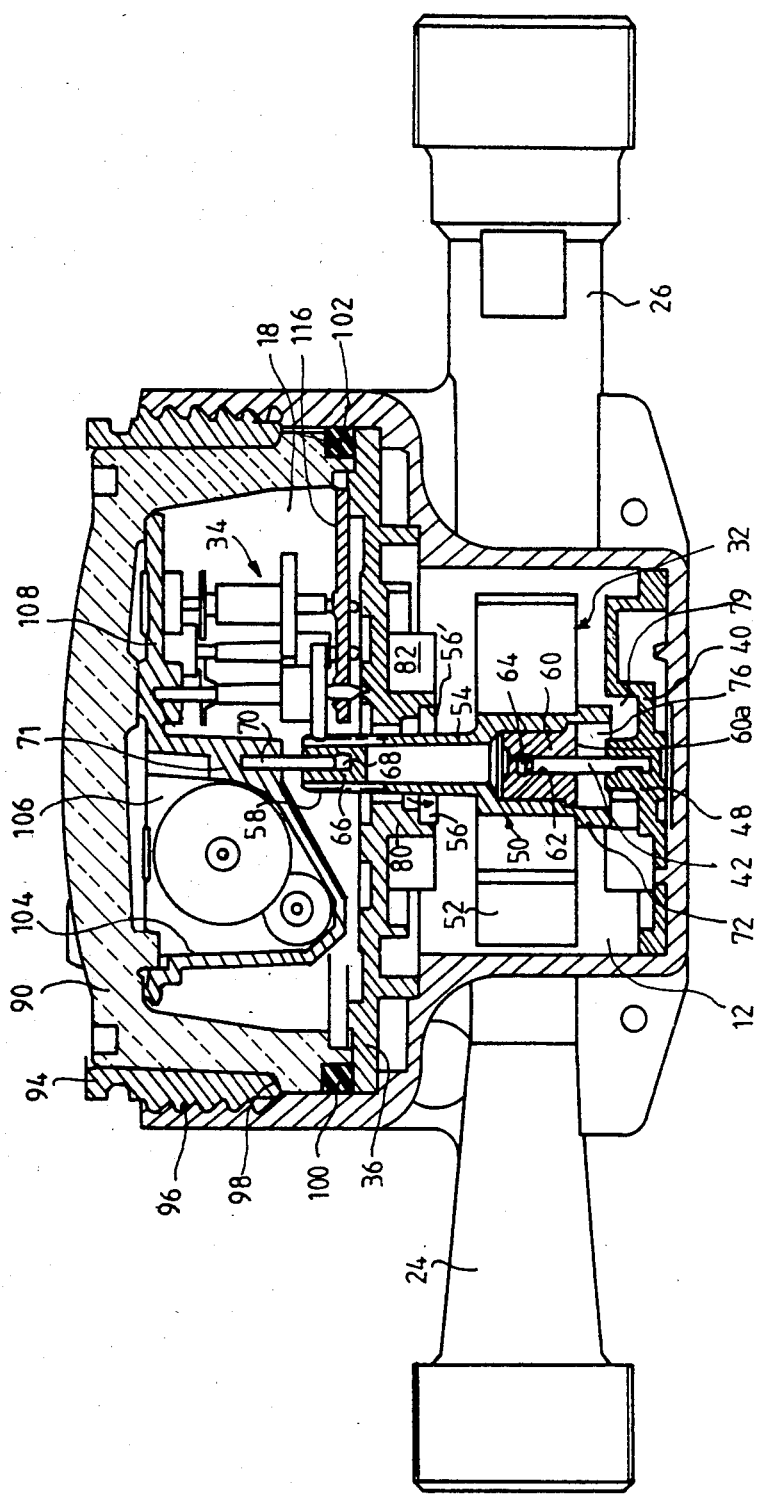
FIG. 3 is a section view through the meter as a whole on the same line as FIG. 2.

The top portion 18 serves to house display means bearing a general reference 34 in FIG. 3. This same figure shows that the bottom and top portions 12 and 18 are separated in a non-watertight manner by a wall 36 which is disposed in a plane perpendicular to the axis XX'.

As can be seen more clearly in FIGS. 1 and 2, the bottom 14 of the measuring chamber 12 is covered by a plate 40 covering the entire bottom 14. The plate 40 has two functions: firstly it serves to hold a pivot shaft 42 disposed along the axis XX' of the meter bowl, and secondly it serves to define fixed ribs such as 44 which project from the main face 46 of the plate 40.

In the preferred embodiment, the plate 40 is made of a plastic material. The base 42a of the pivot shaft 42 is moulded into a thickened portion 48 of the plate 40. There are four ribs 44 which are disposed along radii at 90° intervals.

A first and well-known function of the ribs 44 is to create a braking torque for the turbine 32 at high flow rates.

As can be seen in FIG. 3, the turbine 32 comprises a hub 50 on which straight blades 52 are mounted. The hub is extended by a shaft 54 which passes through the partition 36 via an orifice 56. The shaft 54 has an outside diameter which is substantially less than the outside diameter of the hub 50. The end 58 of the shaft 54 is toothed and meshes with the inlet to the totalizer 34 in a manner explained below. The overall operation of the meter can be seen from the above description: the injector 24 is connected to an upstream water inlet pipe and causes the liquid to penetrate into the measuring chamber 12 in such a manner that the distribution of water speeds in the terminal right cross section of the injector is as uniform as possible. In the measuring chamber 12 the jet of liquid causes the turbine 32 to rotate and the water then leaves via the ejector 26. The speed of rotation of the turbine is proportional to the speed of the liquid. The totalizer 34 is driven by the turbine 32 and serves to display the amount of water used.

However, as already mentioned, it is necessary to provide a special pivot system for the turbine so that the meter has adequate measuring qualities for it to be given a C classification, i.e. the highest quality classification for water meters.

Figure 5:
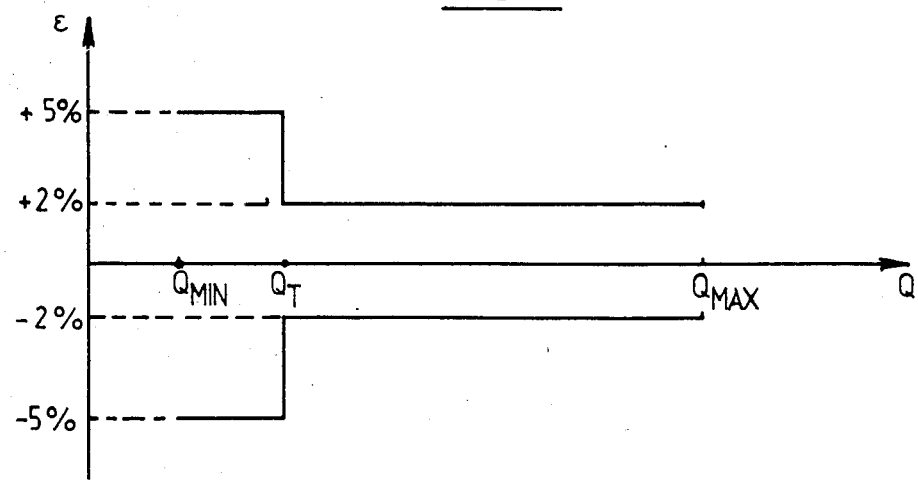
FIG. 5 is a graph for calibrating a water meter.
Figure 6D:
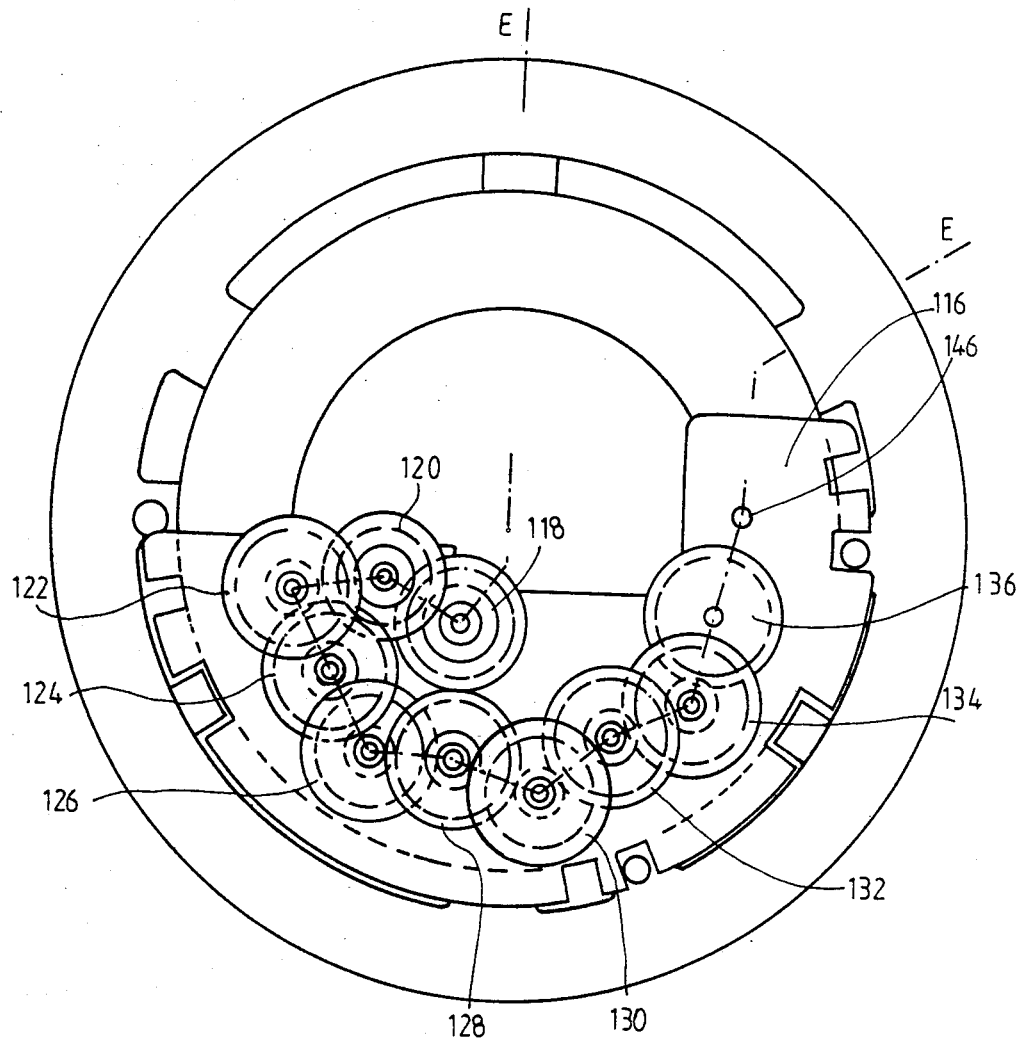
FIG. 6d is a plan view of the display showing the gear train used thereby.
Figure 6E:
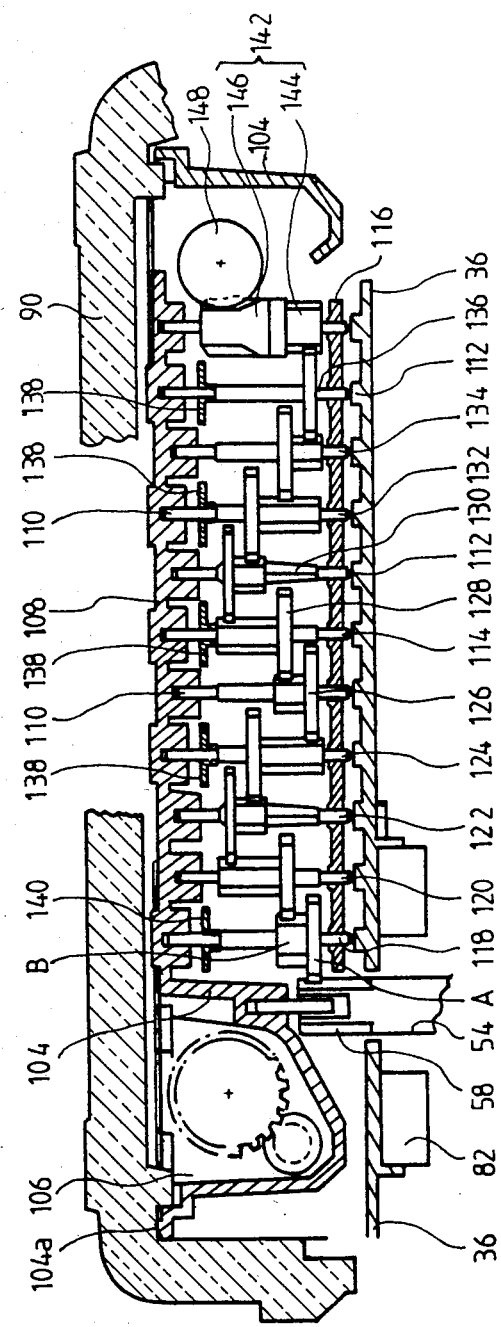
FIG. 6e is a developed view of the FIG. 6d gear train on a line E—E.

FIG. 5 gives the calibrating characteristics of a class C meter having a nominal flow rate of:

$$Q_n = 1.5 \text{ m}^3/\text{h}.$$

At less than a minimum flow rate $Q_{min} = 0.01 Q_n$ (i.e. 15 liters per hour (l/h)) no sensitivity is required.

At flow rates greater than $Q_{min}$ and less than $Q_T$ (where $Q_T = 0.015 Q_N = 22.5$ l/h) the maximum measuring error must lie in the range $+5\%$ and $-5\%$.

Finally, from $Q_T$ to $Q_{max} = 2Q_N = 3$ m$^3$/h) the maximum measuring error must lie in the range $+2\%$ and $-2\%$.

It will be understood that the most difficult part of these requirements to satisfy with mass production techniques is the range between $Q_{min}$ and values slightly greater than $Q_T$.

Returning to FIG. 3, it can be seen that the hub 50 of the turbine 32 together with the shaft 52 which extends therefrom are hollow. The hub 50 is closed by a lower plug 60 having an axial blind bore 62 for freely receiving the pivot shaft 42. The end of the blind bore 62 is fitted with a jewel 64 suitable for co-operating with the point 42b of the pivot 42. The jewel 64 thus constitutes a bottom axial stop or abutment for the turbine. Likewise, the top of the hollow shaft 52 is closed by a solid top part 66 having a blind axial bore 68 for freely receiving an upper pivot shaft 70 fixed to a frame 71 of the totalizer 34. The upper pivot shaft 70 and the lower pivot shaft 42 are very accurately aligned with the axis XX'. This turbine construction is such that the apparent weight of the turbine when immersed in water is substantially less than 1 gram (g). Further, the center of thrust is disposed on the axis XX'.

FIG. 3 shows that the turbine hub 50 projects beyond the lower face 60a of the plug 60 by means of a collar 72. The collar 72 thus defines a zone 76 which is open at its bottom end. This zone 76 has an inside diameter which is greater than the diameter of the base 48 in which the lower pivot shaft 42 is received. Further, when the point 42b of the pivot shaft 42 is in contact with the jewel 64, the bottom face of the collar 72 is very slightly below the top face of the base 48 and the top edges of the fixed ribs 44. The bottom end of the collar 72 thus penetrates into an annular zone 79 which is delimited on the inside by the base 48 and on the outside, at least in part, by the ribs 44. Thus, when the turbine is in this axial position there exists a passage of reduced cross section between the zone 76 and the remainder of the measuring chamber 12.

Returning to the partition 36 separating the measuring chamber 12 from the display chamber 18, it can be seen that the lower face of the partition adjacent to the chamber 12 includes a second central portion 80 through which the orifice 56 is provided. The central portion 80 is surrounded by fixed radial fins such as 82. Thus, from the hydraulic point of view, the measuring chamber 12 has a substantially symmetrical structure about a median plane perpendicular to the axis XX' and containing the axis YY', because of the top and bottom sets of fixed fins or ribs 82 and 44.

When the speed of turbine rotation increases, a reduced pressure phenomenon tends to develop at both ends of the hub of the turbine about the axis of rotation XX'. However, no significant reduced pressure effect develops above the partition 36. Nevertheless, because the collar 72 begins by penetrating into the annular hollow 79 the reduced pressure phenomenon is much reduced at the bottom face of the hub, i.e. the bottom face of the plug 60 and of the collar 72. In contrast, the top end of the hub is subjected to the full force of this reduced pressure phenomenon. As a result the turbine is raised, and the point 42a of the lower pivot shaft 42 is no longer in contact with the jewel 64. The faster the turbine rotates the more it rises. The pivot shafts 42 and 70 thus only serve to guide turbine rotation. As the turbine rises, the bottom end of the collar 72 moves out of the annular space 79. As a result the reduced pressure phenomenon increasingly occurs at the bottom face of the hub until the syphon phenomena occurring at both ends of the turbine reach substantial equilibrium, thereby preventing the turbine from rising any further even through the end 66 of the top pivot shaft 70 has not come into contact with the end of the top blind bore 68. Turbine lifting is thus regulated and in any event the turbine is never raised so far as to cause its top pivot to come into abutment. Tests have shown that for the meter under consideration the turbine is raised by about 0.7 mm to 1 mm. In addition, as can be seen in FIG. 3, the orifice 56 through which the turbine shaft passes is in the form of a stepped funnel which flares towards the measuring chamber. This arrangement helps retain good measuring qualities for the meter in spite of the turbine being raised, by acting on the flow of liquid between the chambers 12 and 18.

It can thus be seen that for very low speeds of rotation, the bottom pivot is in contact with the jewel 64, but that as the speed increases this contact is removed, thereby making it possible to use a bottom pivot point which is very fine and therefore gives rise to a reduced friction torque. In contrast, at high speeds of rotation there is no contact between the hub and the end of the top pivot shaft. It is thus not necessary to provide a jewel at the top of the hub, and since the top pivot shaft has no need to withstand any axial thrust, it need not be particularly robust. Its sole function is to guide the turbine in rotation.

More generally, unlike the meter described in published French patent specification No. 2 336 666, the problem of endurance of the top pivot simply does not arise.

It would be possible to provide a single metal shaft passing through the turbine hub from end to end, instead of providing two stub shafts as described.

However, such a solution suffers from the drawback of increasing the real weight of the turbine, thus making it more difficult to obtain the required apparent weight. Intermediate solutions suffer from the same problem in varying degree.

The display means 34 shown in FIG. 3 is now described in greater detail with reference to FIGS. 6a to 6e.

As is well known, water meter display means are of two main types: they are either of the dry type, i.e. the display components are lodged in a space which is sealed from the liquid to be measured and transmission between the turbine and the totalizing wheels is magnetic; or else they are of the wet type, i.e. the display components are immersed in the liquid to be measured.

In the meter described, the analog display of submultiples of a cubic meter of water is of the wet type, while the totalizer for displaying the numbers of cubic meters consumed is of the clean type, i.e. it is immersed in a liquid which is separate from the liquid to be measured.

As shown in FIG. 3, the display means 34 is lodged in the upper portion 18 of the bowl 10. The portion 18 is closed by a transparent cover 90. The cover 90 is fixed to the bowl 10 by a threaded ring 94 which co-operates with a threaded portion 96 provided on the inside face of the side wall 20 of the bowl 10. The end of the ring 94 bears against an outer shoulder 98 of the cover 90. Sealing between the cover 90 and the bowl 10 is obtained by an annular gasket 100 which is clamped between the periphery of the partition 36, the bottom portion of the side wall 20 and a shoulder 102 provided by the cover 90. In the space delimited by the partition 36 and the cover 90, the meter includes a part 104 which defines both a housing 106 for the cubic meter totalizer and a plate 108 for supporting the moving parts that display sub-multiples of a cubic meter.

The part 104 is welded around its periphery 104a to the inside face of the cover 90, and the resulting sealed region between the cover and the part 104 is filled with a transparent liquid.

The moving parts of the display assembly are mounted firstly in bearings such as 110 formed by portions of increased thickness of the plate 108 in the part 104, and secondly by axial abutments such as 112 formed by portions of increased thickness in the partition 36 and associated with bearings such as 114 provided in a plate 116 which is fixed to the partition 36 to constitute a counter plate. Each moving part of the display means is constituted by a large diameter toothed wheel A and a small diameter toothed wheel B. In the following description, the large toothed wheels A are referred to as gear wheels, and the small toothed wheels B are referred to as pinions. Each moving part with its gear wheel and pinion is received between a top bearing 110 and a bottom bearing 112, 114. The moving parts are referenced 118 to 136. The A wheel of the first part 118 meshes with the toothed end of the turbine shaft 54. Moving parts 124, 128, 132 and 136 serve respectively to display tenths of a liter, liters, tens of liters and hundreds of liters. To do this, each of these moving parts includes a disk 138 fitted with an index mark. Further, the first moving part 118 serves to indicate whether the meter is working and is also provided with a disk 140 bearing an index mark. The other moving parts 120, 122, 126, 130 and 134 are intermediate moving parts.

A last moving part 142 has a pinion 144 which meshes with the A wheel of the moving part 136 and an endless screw 146 which meshes with an inlet gear wheel 148 to the totalizer. The inlet gear wheel 148 is fixed to one end of a shaft 150 of the totalizer. The shaft 150 passes in sealed manner by virtue of a gasket 151 through a portion of the part 104 which delimits the housing 106. The totalizer comprises five display wheels referenced 152 to 160. The wheel 152 is fixed to rotate with the shaft 150, whereas the other wheels are free to rotate thereon. Movement is transmitted from one wheel to the next wheel by means of four ratchets referenced 164 to 170 which are free to rotate on a second shaft 172 parallel to shaft 150. Each of the ratchets 164 to 170 has a first pinion C which co-operates with a corresponding one of the wheels 152 to 158, and a second, partially-toothed pinion D which co-operates with the immediately following wheel 154 to 160 in such a manner that when any one of the wheels 152 to 158 has completed one full rotation, the following wheels 154 to 160 is turned through one-tenth of a rotation. Each of the wheels 152 to 160 has the digits 0 to 9 marked on its edge. The totalizer thus serves to display cumulated consumption from 1 m$^3$ up to 99,999 m$^3$.

The face of the part 104 turned towards the cover 90 has an opaque face 164 pierced by window 166 and 168 disposed respectively over the wheels of the totalizer and over the disks 138, 140 of the display moving parts 118, 124, 128, 132 and 136.

This totalizer structure together with careful design of the teeth of the various moving parts makes it possible to provide a totalizing display means having very low friction.

It should also be mentioned, that in order to avoid the part 104 which separates the totalizer housing 106 and its fill of special liquid from the rest of the portion 18 of the bowl filled with the liquid to be measured, being subjected to pressure differences between said liquids, a deformable glove finger 180 is provided. The glove finger 180 is fixed in sealed manner to the part 104 by a collar 182. Pressure equalization from one side of the part 104 to the other is thus obtained. Further, the space 161 lying between the cover 90 and the face 163 is filled with the transparent liquid. The information provided by the moving display parts is improved relative to embodiments in which it is only the housing for the totalizer per se which is filled with special liquid.

Another aspect of the invention which improves the sensitivity of the meter to low flow rates is now described with reference to FIG. 7.

This aspect consists essentially in giving the lower ribs 44, and preferably also the upper ribs 82, a special disposition and shape which serves at low flow rates to increase the speed of laminar flow of the liquid in the immediate vicinity of the turbine 32, i.e. in the zones of the measuring chamber where the liquid effectively drives the turbine.

In known single jet meters there exists a set of radiating ribs fixed to the bottom of the measuring chamber. These ribs have a length which is substantially equal to the length of the turbine blades. The ribs serve to create a braking torque on the turbine at high speeds of rotation, and they also serve, as specified in the above-mentioned French patent specification, to encourage turbine lifting in the same range of speeds. The height of these ribs ensures that there is a considerable distance between the bottom edge of the turbine blades and the effective bottom of the measuring chamber. Laminar flow which develops therein thus has practically no effect on driving the bottom edge of the turbine blades at low liquid flow rates.

In order to remedy this drawback, the bottom ribs (and also preferably the top ribs) of the measuring chamber are so sized that they cause vortices to be created in the spaces separating the ribs.

Figure 7:
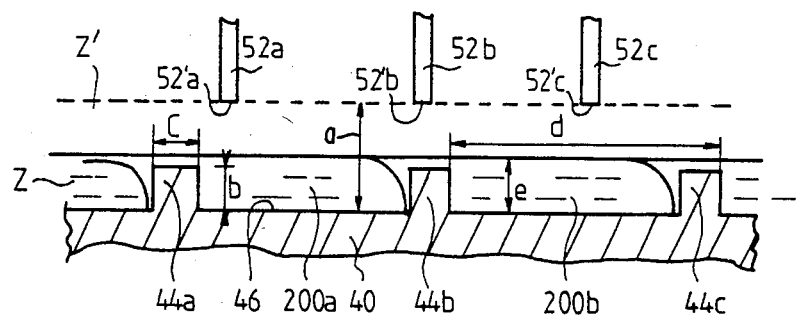
FIG. 7 is a developed section view on a semi-circle VII—VII of FIG. 1 showing how the ribs form vortices.
Figure 4:
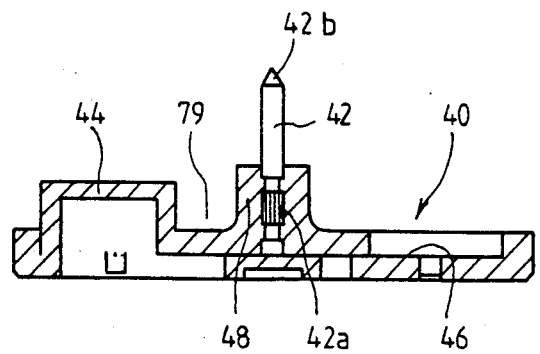
FIG. 4 is a section view showing a portion of FIG. 2 to a larger scale to show details of a preferred embodiment of fixed internal ribs in the meter.
Figure 6B:
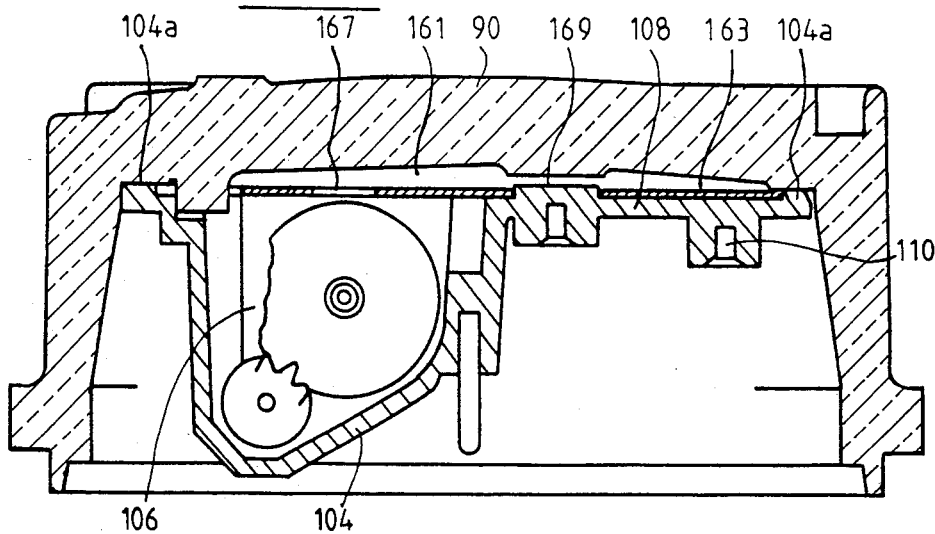

FIG. 7 is a developed view of half of the bottom portion of the chamber on a semi-cylindrical section VII marked in FIG. 1. The ribs 44a, 44b and 44c can be seen separated by spaces 200a and 200b. Turbine blades 52a, 52b and 52c can also be seen. The bottom edges 52'a, 52'b and 52'c of the blades are at a distance a from the bottom of a chamber, i.e. more exactly from the top face of the plate. Each rib 44 is of height b and thickness c. The distance separating two consecutive ribs in the "plane" of the figure is equal to d. The values b, c and d are determined in such a manner that the ribs develop vortex phenomena in a zone Z referred to as a "hydraulic plug", such that for flow rates in the range a little less than $Q_{min}$ to a little more than $Q_T$ said zone has a thickness in the direction of the axis XX' e which is greater than or equal to b. Thus, the hydraulic plug at least partially fills the spaces 200a, 200b. The height of the zone Z' which is available for laminar flow thus has a height a−e which is less than or equal to the distance between the bottom edge 52' of the turbine blades and the top face 44' of the ribs. More generally, the height a−e is not greater than said distance.

The cross-section of the passage available for laminar flow thus corresponds to the height a−e and is therefore on average considerably reduced relative to the cross-section which obtains in prior art single jet meters which have a measuring chamber and a turbine of the same size. The speed of the laminar flow is thus increased at low flow rates.

By way of example, in the meter described a equals 10 mm, b equals 6 mm, and c equals 4 mm.

More generally, considering a semi-cylindrical section having a radius equals to h, the following ratios are to be satisfied $$1.3 \leq b/c \leq 1.6$$

and $$0.15 \leq c/d \leq 0.25$$

Preferably, the same arrangements are provided for the top ribs 82 which thus form a "hydraulic plug" adjacent to the top wall of the measuring chamber.

In the above description, the turbine has a positive apparent weight. An entirely analogous meter could be provided within the scope of the invention using a turbine having a negative apparent weight. In such a case, various arrangements described as being at the bottom and at the top of the measuring chamber would havr to be provided at the top and at the bottom of the measuring chamber respectively. In particular, instead of being raised at high flow rates, the turbine would then be "lowered" and the pivot shaft having a fine point would be disposed at the top of the measuring chamber rather than at the bottom thereof.

We claim:

1. A single jet liquid meter comprising: a cylindrical measuring chamber having first and second end walls perpendicular to the axis of said chamber; an injector and an ejector in communication with said measuring chamber; a turbine having a hub and plurality of blades fixed to said hub, said hub having first and second end faces disposed opposite said first and second end walls respectively; means for guiding the said turbine in rotation about the axis of said chamber; a set of radiating ribs fixed to said first end wall and projecting into said chamber; the meter including the improvement whereby it further comprises an assembly constituting an axial stop disposed adjacent said first end face and constituted by a pivot having a tapering point and an abutment which is in contact with said point when the liquid flow rate is zero, means for subjecting said second end face to a pressure reduction effect produced by rotation of said liquid in said chamber, and means for protecting said first end face from said reduced pressure effect at low speeds of rotation of said turbine, in such a manner that the turbine moves axially to take said point out of contact with said abutment, and to subject said first end face to said pressure reduction phenomenon from a given axial displacement of said turbine, such that said turbine is fixed axially under the reduced pressure effect which is applied to both of said end faces.

2. A meter according to claim 1, wherein said means for protecting said end face comprise an annular space defined by said first end wall of said measuring chamber and a collar fixed to the hub and surrounding said first end face and extending therebeyond, said collar penetrating partially into said annular space when said abutment is in contact with the point of said pivot.

3. A meter according to claim 1, wherein said pivot has a shaft which is fixed to the first end wall of said chamber and wherein said abutment is fixed to the hub of said turbine.

4. A meter according to claim 3, wherein said means for guiding the turbine in rotation comprise: firstly a first axial blind bore opening out into said first end face with said pivot shaft penetrating into said first axial bore; and secondly a shaft fixed to said second end face, said shaft being provided with a second axial blind hole in which a second fixed pivot shaft is received.

5. A meter according to claim 1 wherein at low flow rates of the liquid to be measured said ribs generate vortex phenomena in the spaces separating said ribs such that said vortex phenomena creates a hydraulic plug in the vicinity of said first end wall with a zone left free for laminar flow between the meter turbine and said hydraulic plug extending in the direction of said axis of rotation over a length which is not greater than the distance in the same direction between said ribs and said turbine.

6. A meter according to claim 5, further comprising a second set of radiating ribs fixed to said second end wall.

7. A meter according to claim 6, wherein each set of ribs comprises four ribs which are uniformly angularly spaced.

8. A meter according to claim 1, further including a display assembly disposed in a second chamber which is closed by a transparent cover and which communicates with said measuring chamber via an orifice, said display assembly comprising a wheeled totalizer and a plurality of moving parts for providing tansmission between said turbine and said totalizer, at least some of said moving parts including display marks, said second chamber including a transparent partition defining together with said cover a sealed volume constituting a housing for said totalizer and a plate to which one end of each said moving parts is pivoted, said space being filled with a transparent liquid, said partition including a deformable member for equalizing pressures between the liquids filling said space and the remainder of said second chamber respectively.

9. A single jet liquid meter comprising:
a cylindrical measuring chamber having first and second end walls perpendicular to the axis of said chamber;
an injector having a longitudinal axis and an ejector in communication with said measuring chamber, the distance between the axis of said chamber and the axis of said injector being equal to h;
a turbine having a hub and plurality of blades fixed to said hub, said hub having first and second end faces disposed opposite said first and second end walls respectively;
means for guiding said turbine in rotation about the axis of said chamber;
an assembly constituting an axial stop disposed in the vicinity of said first end face and formed by a pivot having a point and an abutment which is in contact with said point when the liquid flow rate is zero; and
a set of radiating ribs fixed to the first end wall of the measuring chamber, the cross-section of each rib being substantially rectangular in shape with a dimension equal to c in a direction parallel to said end walls and a dimension equal to b in the direction of the axis of said chamber, and, in a cylindrical section by a cylinder having the same axis as said chamber and a radius equal to h, the distance between two consecutive ribs being equal to d, the following relation being satisfied $1.3 \leq b/c \leq 1.6$ and $0.15 \leq c/d \leq 0.25$ whereby at low flow rates of the liquid to be measured said ribs generate vortex phenomena in the spaces separating said ribs such that said vortex phenomena creates a hydraulic plug in the vicinity of said first end wall with a zone left free for laminar flow between the meter turbine and said hydraulic plug extending in the direction of said axis of rotation over a length which is not greater than the distance in the same direction between said ribs and said turbine.

10. A meter according to claim 9, further including a display assembly disposed in a second chamber which is closed by a transparent cover and which communicates with said measuring chamber via an orifice, said display assembly comprising a wheeled totalizer and a plurality of moving parts for providing transmission between said turbine and said totalizer, at least some of said moving parts including display marks, said second chamber including a transparent partition defining together with said cover a sealed volume constituting a housing for said totalizer and a plate to which one end of each of said moving parts is pivoted, said space being filled with a transparent liquid, said partition including a deformable member for equalizing pressures between the liquids filling said space and the remainder of said second chamber respectively.

11. A meter according to claim 9 wherein said ejector and said injector have the same longitudinal axis.

12. A meter according to claim 9, further comprising a second set of radiating ribs fixed to said second end wall.

13. A meter according to claim 12, wherein each set of ribs comprises four ribs which are uniformly angularly spaced.

* * * * *